T. F. DEVLIN.
EXPANSION BOLT.
APPLICATION FILED MAY 15, 1917.
1,302,324.
Patented Apr. 29, 1919.
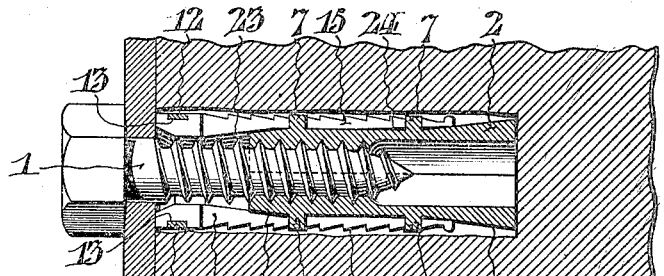
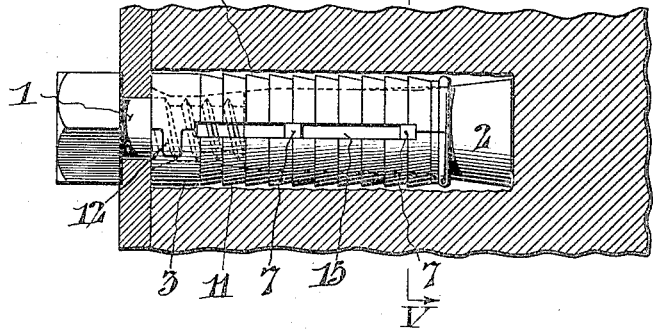
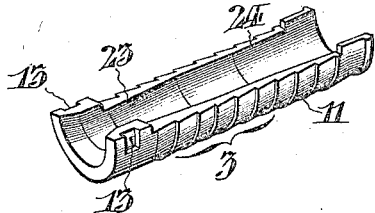
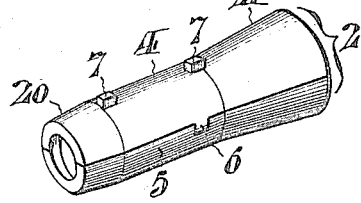
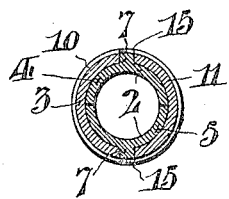
Inventor
Thomas Frank Devlin,
By Maley & Paul
Attorneys.
Witnesses
John C. Bergner.
James H. Bell.

UNITED STATES PATENT OFFICE.

THOMAS FRANK DEVLIN, OF PHILADELPHIA, PENNSYLVANIA.

EXPANSION-BOLT.

1,302,324. Specification of Letters Patent. Patented Apr. 29, 1919.

Application filed May 15, 1917. Serial No. 168,654.

*To all whom it may concern:*

Be it known that I, THOMAS FRANK DEVLIN, of Philadelphia, in the county of Philadelphia and State of Pennsylvania, have invented certain new and useful Improvements in Expansion-Bolts, whereof the following is a specification, reference being had to the accompanying drawings.

My invention relates to an expansion bolt comprising a screw bolt, and a split sleeve as common in this art, and an elongated wedge nut with corresponding extension of the wedging surfaces. The screw bolt is comparatively short, so that when screwed home it does not reach to the far end of the split sleeve. The wedge nut is elongated so that the threaded interior of its inner end sufficiently engages the screw bolt, while the far end projects substantially beyond the far end of the split sleeve. It is, therefore, possible to temporarily remove the bolt altogether and insert the sleeve and wedge nut into the aperture prepared for it, and by driving it therein, the end of the wedge nut comes into contact with the end of the aperture and is thereby advanced relatively to the sleeve with a corresponding preliminary expansion of the sleeve, which is thereby firmly engaged in the aperture. Thereafter the screw bolt is inserted and screwed home, or further rotated to complete the expansion of the sleeve, the firm engagement of which in its aperture prevents it from rotating during this screwing up of the screw bolt.

The wedging surfaces are so arranged as to produce expansion of the split sleeve not only at the far end of said sleeve, but also at its near end. In this way there is secured a firmer grip of the split sleeve upon the aperture within which it is embedded.

The wedging surfaces are preferably compound and are so related as to first produce expansion of the far end of the sleeve, and thereafter a concurrent expansion of both ends of the sleeve. As a further improvement the wedge nut is split as well as the sleeve, but with its plane of division at an angle to that of the sleeve.

In the accompanying drawings, Figure I, is a sectional view and Fig. II, a full view of my expansion bolt, the two views being taken at right angles to each other.

Fig. III, is a perspective view of one element of the split sleeve.

Fig. IV, is a similar view of the wedge nut.

Fig. V, is a sectional view along the line V, V, of Fig. II, of the sleeve and nut.

As common in this art, my expansion bolt comprises as its primary elements a screw bolt 1, a wedge nut 2, and a split sleeve 3.

The screw bolt is as ordinarily used in this art, except that it is shorter than the split sleeve. This is possible owing to the increased length of the wedge nut, as a result of which the interiorly threaded member of the wedge nut is nearer the front end of the sleeve.

The wedge nut 2, is elongated as shown, and is formed of two members 4, and 5, conveniently held together in proper relation by the overlapping tongues 6, integral with one member and bent into proper contact with recesses formed in the sides of the other member. The wedge nut is further provided with guide lugs 7, 7, of which two may be provided on each side, as shown.

The elongation of the wedge nut greatly increases the hold of the screw on the nut. It is much cheaper in this art to employ a lag screw, the end of which is tapered and therefore does not engage the nut. By using a long nut it is insured that some half dozen turns of the screw thread will fully engage the front threaded end of the nut.

The length of the wedge nut is such that its rear end projects some distance beyond the rear of the split sleeve, the two not coming even until the wedging action has progressed to a considerable extent. As a result the driving of the expansible sleeve into the aperture prepared for it in the wall, results in expansion of the sleeve without insertion of the bolt. Thereafter the bolt may be inserted and used to effect further tightening. It is easier to thus expand the sleeve as part of the operation of insertion. It also avoids the possible turning of the sleeve which often occurs when the initial expansion must be effected by turning the bolt. By placing the interiorly threaded part of the sleeve near the front end of the nut, the subsequent engagement of the bolt with the nut is made easy.

The split sleeve 3, is formed of two sections 10 and 11, substantially alike and united by the overlapping tongues 12, formed integrally with one section, and wrapping partly around the other section, so as to fit into recesses 13, 13, formed therein. The tongues 12, exert sufficient pressure to normally hold the two sections of the sleeve in proper relation to each other, but with capacity for yielding to permit expansion as the sections are driven apart. Slots 15, 15, coincident with the plane of the division of the sleeve, are formed on either side of the sleeve, by cut-away portions, preferably an equal amount of each element being thus cut away. The lugs 7, 7, fit within the slots 15, 15, and prevent the nut from rotating in the sleeve. The slots are sufficiently long to permit the desired longitudinal travel of the wedge nut within the split sleeve to produce the desired expansion. The lugs thus serve to maintain the wedge nut in proper relation to the split sleeve both prior to and during its use.

The outer surface of the wedge nut is tapered to form wedging surfaces 20, and 21, there being preferably two of these, one in the region of the front and the other of the rear end of the wedge nut. Corresponding wedging surfaces 23, and 24, are formed on the inner surface of the split sleeve. This elongation of the wedge nut and provision of wedging surfaces near each end of the sleeve result in a more even expansion of the whole sleeve, producing a firmer bite of the sleeve when expanded within the aperture formed for it. For promotion of this bite the outer surface of the split sleeve may be corrugated or toothed as shown.

I prefer to so relate the two wedging surfaces of the sleeve to each other that the wedging action of the far end of the wedge nut comes into play a little before the wedging surface of the near end of the nut, so that there occurs a preliminary expansion of the far end of the sleeve followed by a simultaneous expansion thereafter of both ends of the sleeve. In this way it is insured that the grip of the sleeve within its aperture is most firm.

By making the screw bolt comparatively short, so that after the bolt is screwed home it does not project beyond the rear end of split sleeve, and at the same time making the wedge nut long enough to permit its front threaded end to be properly engaged with such a short screw bolt, I obtain a combination which has distinct advantages. It is not necessary under these circumstances to cut off the end of the screw according to the depth of the aperture to be occupied by the expansion bolt, nor to otherwise fit the adjustment of the parts of the expansion bolt to the hole which has been prepared for it, since the entire expansive capacity of the device may be brought into play without reference to the depth to which any of its parts enter the aperture. In order to avoid undue friction I confine the threading of the wedge nut to some half dozen screw threads formed nearest the forward end, leaving the rear end unthreaded and large enough to receive the end of the screw bolt without contact.

Having thus described my invention, I claim:

In an expansion bolt, the combination of a split sleeve with interior wedging surfaces, a wedge nut with corresponding wedging surfaces adapted to coöperate with those of the split sleeve, the relation of the wedging surfaces of the sleeve to those of the nut being such that as the wedge nut is advanced into the sleeve there occurs a preliminary expansion of the far end of the sleeve followed by a subsequent simultaneous expansion of both ends of the sleeve.

In testimony whereof, I have hereunto signed my name, at Philadelphia, Pennsylvania, this tenth day of May, 1917.

THOMAS FRANK DEVLIN.

Witnesses:
JAMES H. BELL,
E. L. FULLERTON.

Copies of this patent may be obtained for five cents each, by addressing the "Commissioner of Patents, Washington, D. C."